US007014233B2

(12) United States Patent
Chen

(10) Patent No.: US 7,014,233 B2
(45) Date of Patent: Mar. 21, 2006

(54) PORTABLE SUCTION DEVICE

(75) Inventor: Timmy Chen, Taichung (TW)

(73) Assignee: Plus Craft Industrial Co., Ltd., Taichung (TW)

( * ) Notice: Subject to any disclaimer, the term of this patent is extended or adjusted under 35 U.S.C. 154(b) by 0 days.

(21) Appl. No.: 10/797,070

(22) Filed: Mar. 11, 2004

(65) Prior Publication Data

US 2004/0178647 A1 Sep. 16, 2004

Related U.S. Application Data

(63) Continuation-in-part of application No. 10/190,521, filed on Jul. 9, 2002, now abandoned.

(51) Int. Cl.
*A47J 45/00* (2006.01)

(52) U.S. Cl. ........................................ 294/64.1; 294/15

(58) Field of Classification Search ............... 294/64.1, 294/15; 248/362, 363; 269/21
See application file for complete search history.

(56) References Cited

U.S. PATENT DOCUMENTS

| | | | | |
|---|---|---|---|---|
| 2,280,658 A * | 4/1942 | Miller | ........................ | 294/64.2 |
| 5,330,314 A * | 7/1994 | Bennison | .................... | 414/627 |
| 6,343,823 B1 * | 2/2002 | Busby | ........................ | 294/64.1 |

FOREIGN PATENT DOCUMENTS

| | | | |
|---|---|---|---|
| DE | 833847 | * | 3/1952 |

* cited by examiner

*Primary Examiner*—Eileen D. Lillis
*Assistant Examiner*—Esther Onyinyechi Okezie
(74) *Attorney, Agent, or Firm*—Rosenberg, Klein & Lee

(57) ABSTRACT

A suction device includes a handle (10) and an operation lever (30) which has a cam end (32) pivotably connected to the handle. A suction disk (20) has a shaft (21) which movably extends through the underside of the handle and is pivotably connected to the cam end. A release device (40) is connected to a side of the handle and removably engaged with a hole in a side of the operation lever and the handle. The release device can be easily operated by the thumb of the user to disengage the shaft from the operation lever, and the suction disk is pushed back by a spring (22) mounted to the shaft.

7 Claims, 7 Drawing Sheets

PORTABLE SUCTION DEVICE

CROSS-REFERENCES TO RELATED APPLICATIONS

The present invention is a continuation-in-part application of the U.S. Ser. No. 10/190,521, filed on 9 Jul. 2002 now abandoned.

BACKGROUND OF THE INVENTION

1. Field of the Invention

The present invention relates to a portable suction device that has a suction disk with a handle connected thereto, an operation lever is connected to a shaft of the suction disk and a release device is connected to a side of the operation lever so the user releases the suction disk by only a thumb.

2. Description of the Related Art

A conventional suction device for sucking a piece of object such as a tile generally includes a suction disk and a handle connected to the suction disk. The user holds the handle and operates the suction disk to suck a piece of tile. The shortcoming of the conventional suction device is that the user has to use the other hand to release the suction disk from the tile after the tile is positioned, and usually, the user holds a tool by said the other hand. This is inconvenient for the user to proceed his work. The other type of the conventional suction device employs a release device connected to the handle and the release device has a lever that protrudes out from the suction device and the user must pull the lever to release the suction disk. The release device is difficult to be connected with the suction device and therefore the suction device is suffered by high manufacturing cost. Furthermore, the lever could be pulled unintentionally and let the piece of tile drop.

The present invention intends to provide a suction device that has a release device which is easily operated by the user's thumb.

Another prior art reference are disclosed in the U.S. Pat. No. 5,306,059, the U.S. Pat. No. 4,223,935, the U.S. Pat. No. 4,091,945, the U.S. Pat. No. 3,466,079, the U.S. Pat. No. 2,607,620, the U.S. Pat. No. 2,280,658, the U.S. Pat. No. 2,303,393, the U.S. Pat. No. 2,311,525, the U.S. Pat. No. 2,209,424, the U.S. Pat. No. 2,200,800, the U.S. Pat. No. 1,400,573, the U.S. Pat. No. 4,593,947; in the U.K. patent No. 954315; in the D.E. patent No. 833847; in the A.U. patent No. 120827; and a non-patent Thomson, "weightless Probe For Chip Picking" Apr. 11, 1974, IBM.

SUMMARY OF THE INVENTION

In accordance with one aspect of the present invention, there is provided a suction device which comprises a handle having a neck portion extending from an underside thereof and an operation lever has a cam end pivotably engaged with an opening of the neck portion. A passage is defined through an underside of the neck portion and communicates with the opening. A suction disk has a shaft which is movably engaged with the passage and a spring is mounted to the shaft and biased between the top surface of the suction disk and an underside of the neck portion.

A recess is defined in a wall of the handle and an aperture is defined through an inside of the recess. The aperture communicates with the opening. The shaft is pivotably connected to the cam end of the operation lever and a hole is defined in a side of the operation lever.

A release device movable engaged with the neck portion and the operation lever, a spring biased between the release device and the inside of the recess.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
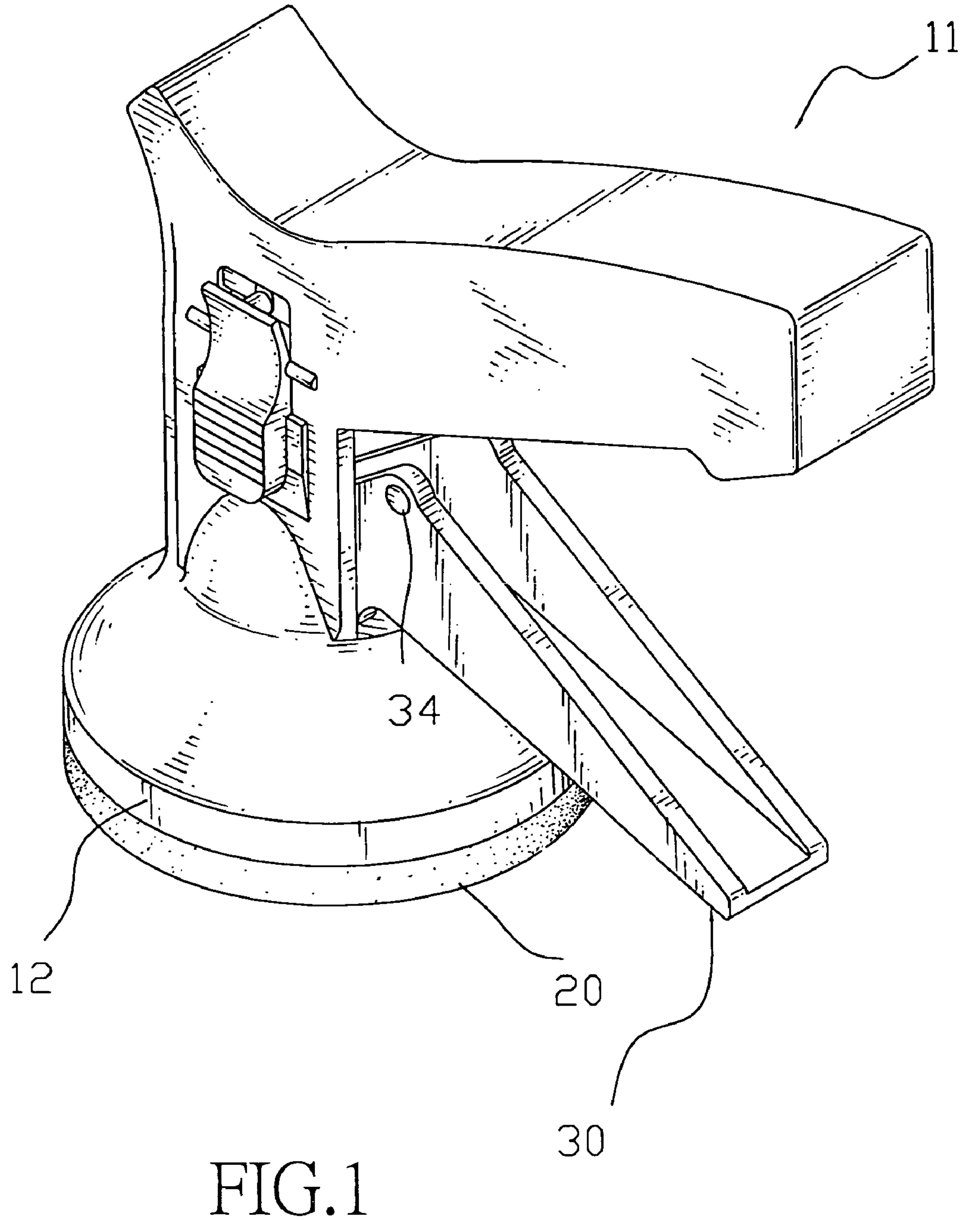
FIG. 1 is a perspective view to show the suction device of the present invention.
Figure 2:
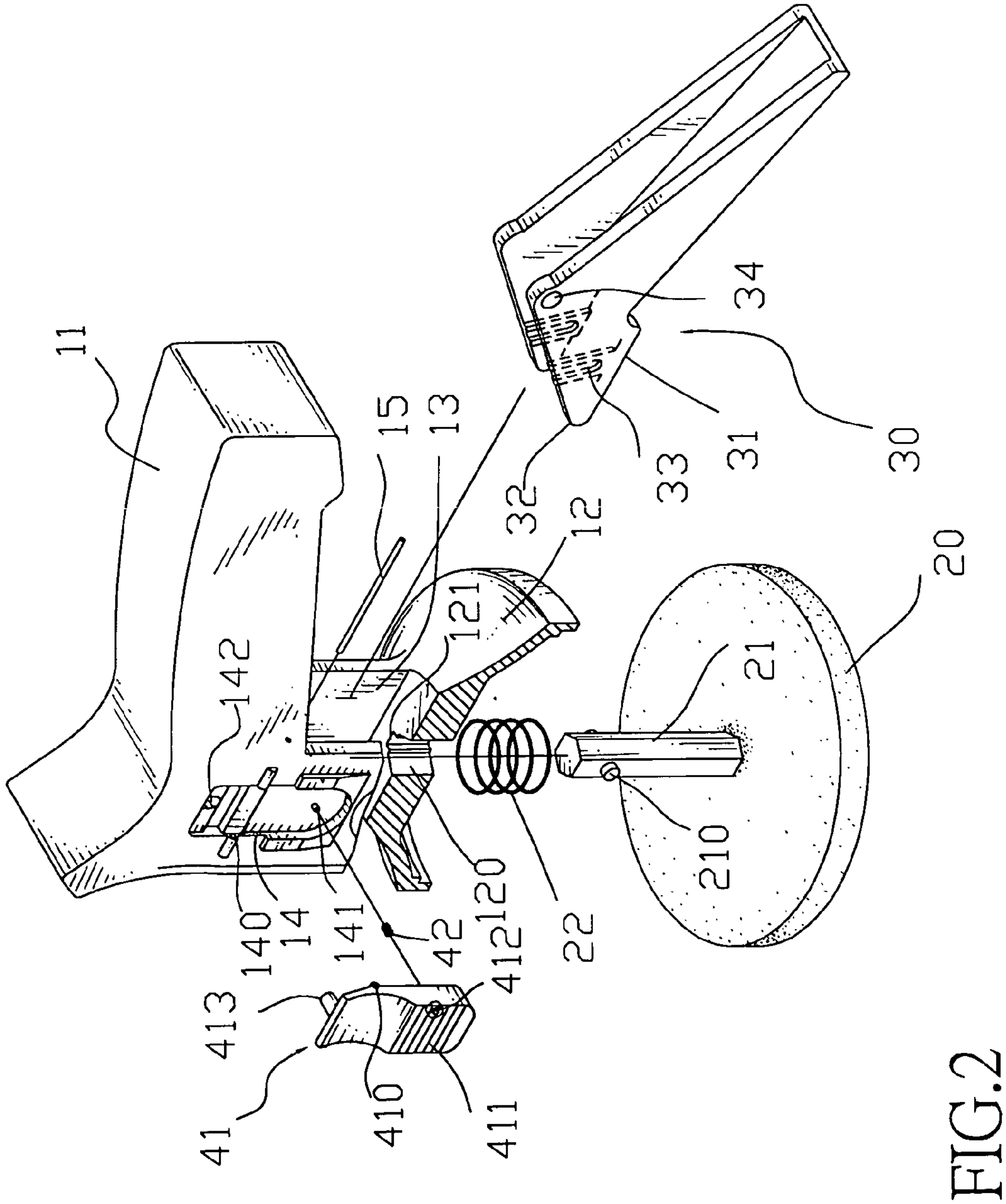
FIG. 2 is an exploded view to show the suction device of the present invention.
Figure 3:
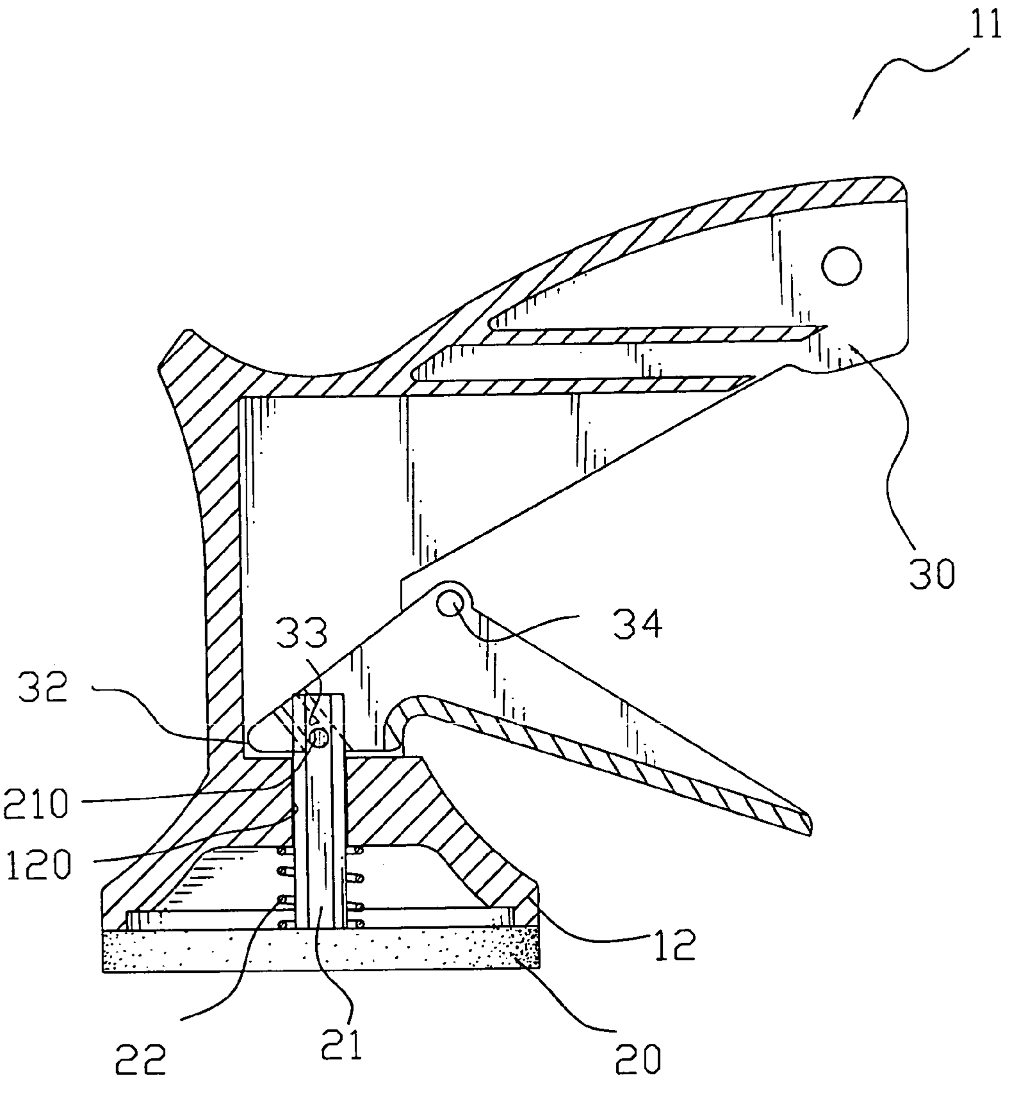
FIG. 3 is a cross sectional view to show the suction device of the present invention.

Referring to FIGS. 1 to 3, the suction device of the present invention comprises a handle 11 having a neck portion extending from an underside thereof and the neck portion has an opening 13. A passage 120 is defined through an underside of the neck portion and communicates with the opening 13. A skirt 12 is connected to the neck portion. A recess 14 is defined in an outside wall of the handle 10 and an aperture 142 is defined through an inside of the recess 14. The aperture 142 communicates with the opening 13.

A suction disk 20 has a shaft 21 extending from a top surface thereof and the shaft 21 is movably engaged with the passage 120. A spring 22 is mounted to the shaft 21 and biased between the top surface of the suction disk 20 and an underside of the neck portion. Two bosses 210 extend from the shaft 21. The skirt portion 12 contacts the top surface of the suction disk 20.

An operation lever 30 has a cam end 32 which is pivotably received in the opening 13 and includes two walls and a groove 33 is defined in an inside of each of the two walls of the cam end 32. A hole 34 is defined in a side of the operation lever 30. The two bosses 210 of the shaft 21 are movably received in the two grooves 33. The cam end 32 has an open top and the two grooves 33 communicate with the open top so that the operation lever 30 is easily to be connected with the two bosses 210 by inserting the bosses 210 in the grooves 33 via the open top. The spring 22 ensures the bosses 210 are located at the end of the two grooves 33. The cam end 32 of the operation lever 30 has a flat underside 31 which is matched with a top surface of the skirt 12.

A release device 41 is pivotably engaged with the recess 14 by a pin 15 extending through the holes 140 defined in the side of the handle 10 and a hole 410 defined in the release device 41. A spring 42 has one end received in a recess 412 in the release device 41 and the other end of the spring 42 is received in the recess 141 in the inside of the recess 14. Therefore, the spring 42 is biased between the release device 41 and the inside of the recess 14. A knurl portion 411 is defined in an outside of the release device 41 for convenience of pressing by a thumb of the user. Further referring to FIG. 5, an insertion 413 extends from the release device 41 and extends through the aperture 142. The insertion 413 is removably engaged with the hole 34 of the operation lever 30. The insertion 413 has a rounded tip.

Figure 4:
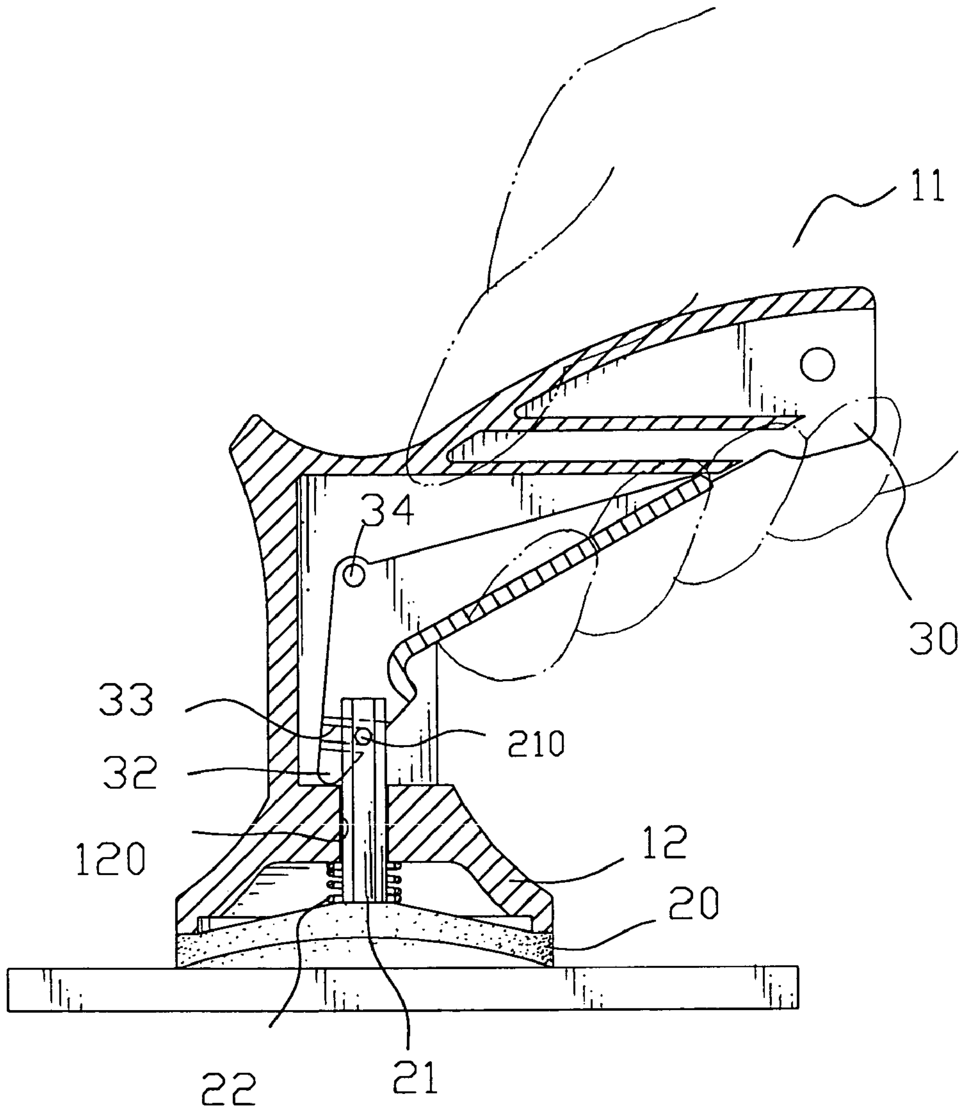
FIG. 4 shows that the operation lever of the suction device of the present invention is pulled to suck the tile.
Figure 5:
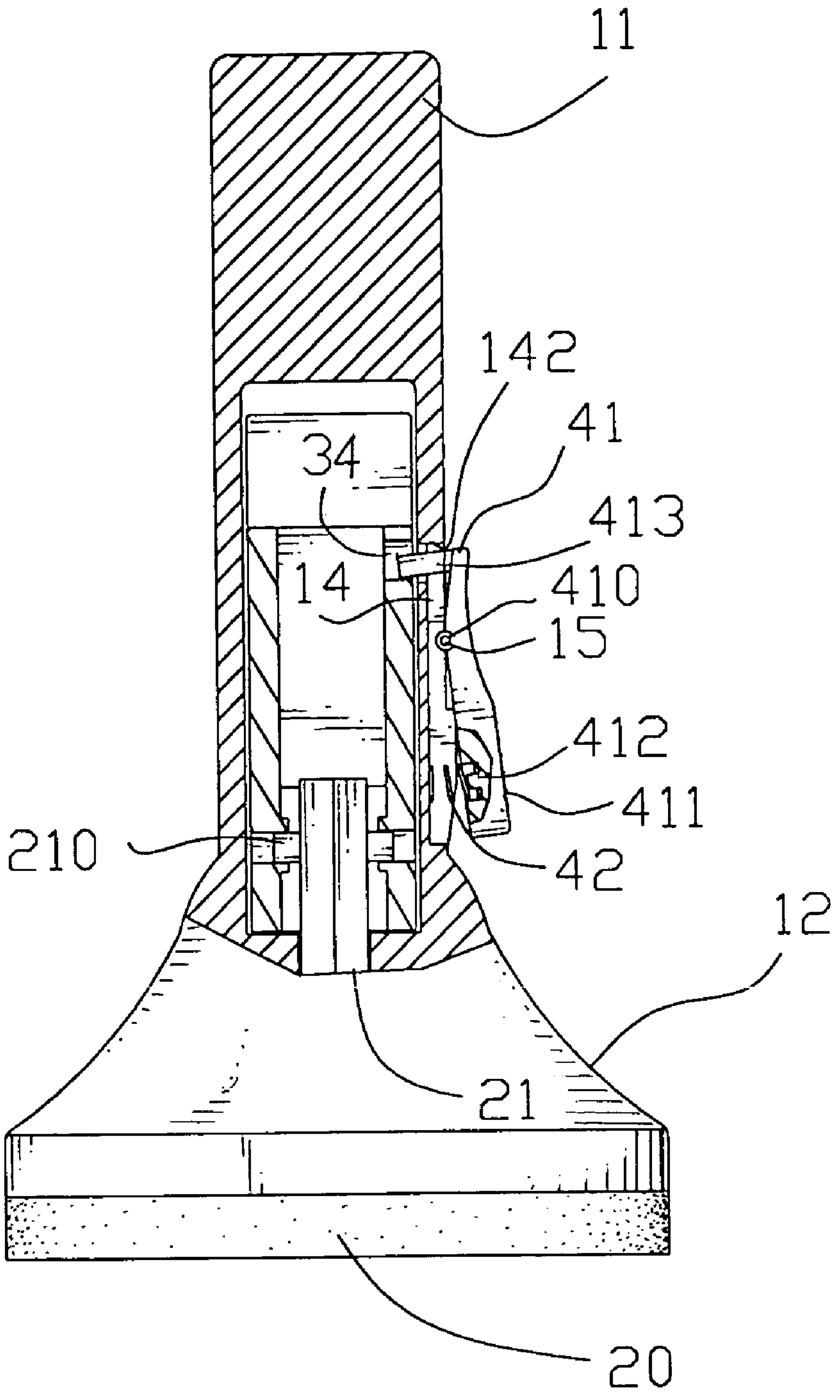
FIG. 5 shows the insertion of the release device is engaged with the hole of the operation lever.
Figure 6:
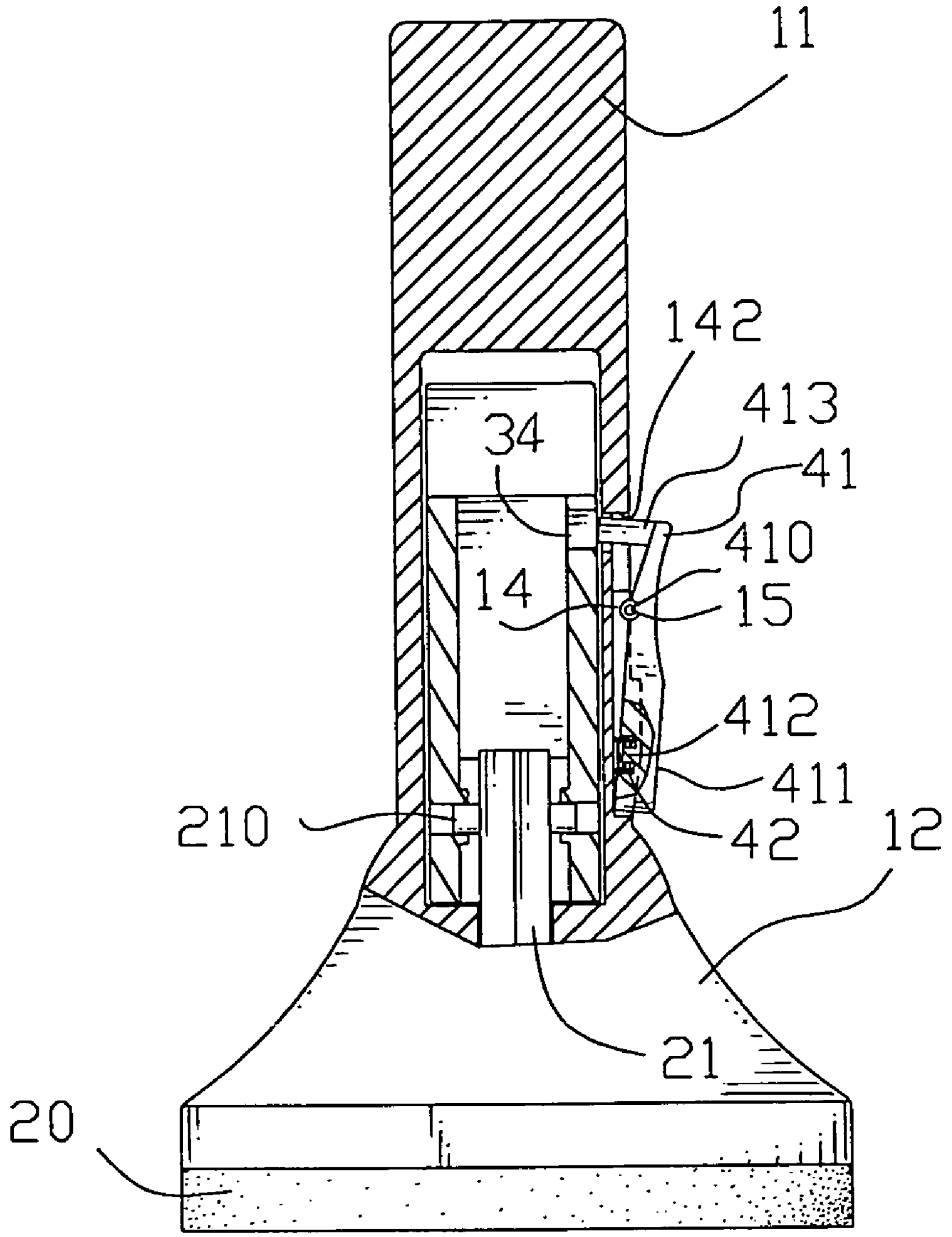
FIG. 6 shows the insertion of the release device is disengaged from the hole of the operation lever.

Referring to FIG. 4, the suction disk 20 is placed on a tile and the operation lever 30 is then pulled, the operation lever 30 is pivoted about the front edge of the cam end 32 and the shaft 21 is lifted and the suction disk 20 sucks on the tile as shown. The periphery of the hole 34 in the operation lever 30 moves over the rounded tip of the insertion 413 which is then engaged with the hole 34 as shown in FIG. 5. After the tile is positioned, the release device 41 is pressed by the thumb of the user as shown in FIG. 6, and the insertion 413 is removed from the hole 34, the operation lever 30 is released by the user and the suction disk 20 is pushed back by the spring 22.

Figure 7:
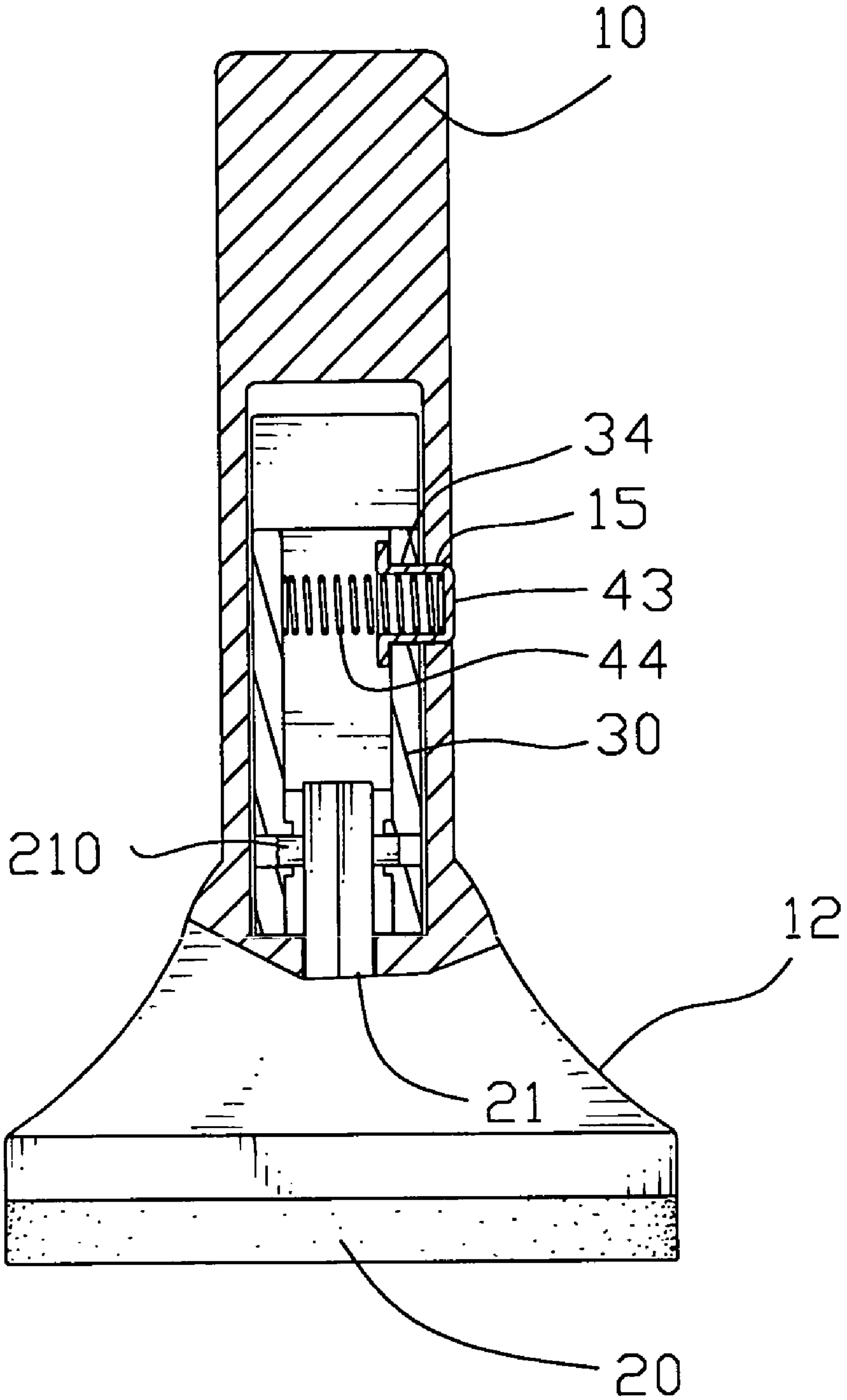
FIG. 7 shows another embodiment of the release device.

Referring to FIG. 7, the release device 41 may also be made to be a simple button 43 which is movably inserted through the hole 34 in the lever 30 and a hole 15 defined through the neck portion of the handle 10. The button 43 has a recess defined in an inside thereof and a spring 44 is biased in the recess and the inside of the lever 30. The button 43 can be pushed inward to disengage from the hole 15 so as to allow the lever 30 to be pivoted.

The operation of the release device 41 is easily completed by the thumb of the user.

While we have shown and described the embodiment in accordance with the present invention, it should be clear to those skilled in the art that further embodiments may be made without departing from the scope of the present invention.

What is claimed is:

1. A suction device comprising:

a handle having a neck portion extending from an underside thereof and the neck portion having an opening, a passage defined through an underside of the neck portion and communicating with the opening;

a suction disk having a shaft extending from a top surface thereof and the shaft movably engaged with the passage, a spring mounted to the shaft and biased between the top surface of the suction disk and said underside of the neck portion;

an operation lever having a cam end pivotably received in the opening and the shaft pivotably connected to the cam end of the operation lever, a hole defined in a side of the operation lever, a release device movably engaged with the neck portion and the operation lever, and a spring biased between the release device and the inside of a recess, wherein said recess is defined in a wall of the neck portion of the handle and an aperture is defined through an inside of the recess, the aperture communicating with the opening, the release device pivotably engaged with the recess and an insertion extending from the release device and extending through the aperture, the insertion removably engaged with the hole of the operation lever.

2. The device as claimed in claim 1, wherein the cam end of the operation lever includes two walls and a groove is defined in an inside of each of the two walls of the cam end, the shaft having two bosses which are movably received in the two grooves.

3. The device as claimed in claim 2, wherein the cam end has an open top and the two grooves communicate with the open top.

4. The device as claimed in claim 1, wherein the insertion has a rounded tip.

5. The device as claimed in claim 1, wherein a skirt portion connected to the neck portion and contacts the top surface of the suction disk.

6. The device as claimed in claim 5, wherein the cam end of the operation lever has a flat underside which is matched with a top surface of a skirt portion of the suction disk.

7. The device as claimed in claim 1, wherein a hole is defined through a wall of the neck portion of the handle and communicates with the opening, the release device is movably received in the hole in the handle and the hole defined in the side of the operation lever, a spring biased between the release device and the inside of the lever.

* * * * *